United States Patent [19]

Oliver

[11] 4,348,197
[45] Sep. 7, 1982

[54] TORQUE-SENSING PULLEY AND DRIVE SYSTEM
[75] Inventor: Larry R. Oliver, Springfield, Mo.
[73] Assignee: Dayco Corporation, Dayton, Ohio
[21] Appl. No.: 115,599
[22] Filed: Jan. 28, 1980
[51] Int. Cl.³ .............................................. F16H 11/04
[52] U.S. Cl. ......................................... 474/28; 474/17
[58] Field of Search ...................... 474/11, 12, 13, 14, 474/17, 19, 28, 50, 70

[56] References Cited

U.S. PATENT DOCUMENTS

| 2,678,566 | 5/1954 | Oehrli | 474/12 X |
| 2,711,103 | 6/1955 | Miner | 474/19 |
| 3,616,706 | 11/1971 | Shimamoto | 474/19 |
| 3,625,079 | 12/1971 | Hoff | 474/12 |
| 3,699,827 | 10/1972 | Vogel | 474/12 |
| 3,771,378 | 11/1973 | Knobel | 474/14 |
| 3,800,608 | 4/1974 | Bessette | 474/14 |
| 3,842,637 | 10/1974 | Wilson | 474/19 |
| 3,884,316 | 5/1975 | Bowers | 474/12 X |
| 3,995,508 | 12/1976 | Newell | 474/50 |
| 4,102,214 | 7/1978 | Hoff | 474/12 X |

FOREIGN PATENT DOCUMENTS 666942  2/1952  United Kingdom ................. 474/28

Primary Examiner—C. J. Husar
Assistant Examiner—Conrad L. Berman
Attorney, Agent, or Firm—Joseph V. Tassone

[57] ABSTRACT

A torque-sensing pulley is disclosed wherein one of the pulley sections is attached to a central shaft, the other pulley section has a cam operatively connected to a matching cam carried by the shaft, means are provided for biasing the cams apart and biasing the pulley sections together, and including damping means for preventing sudden change in the axial spacing of the pulley sections.

10 Claims, 7 Drawing Figures

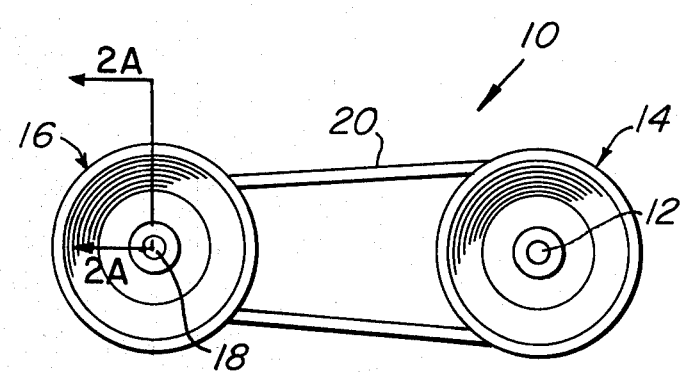
FIG-1
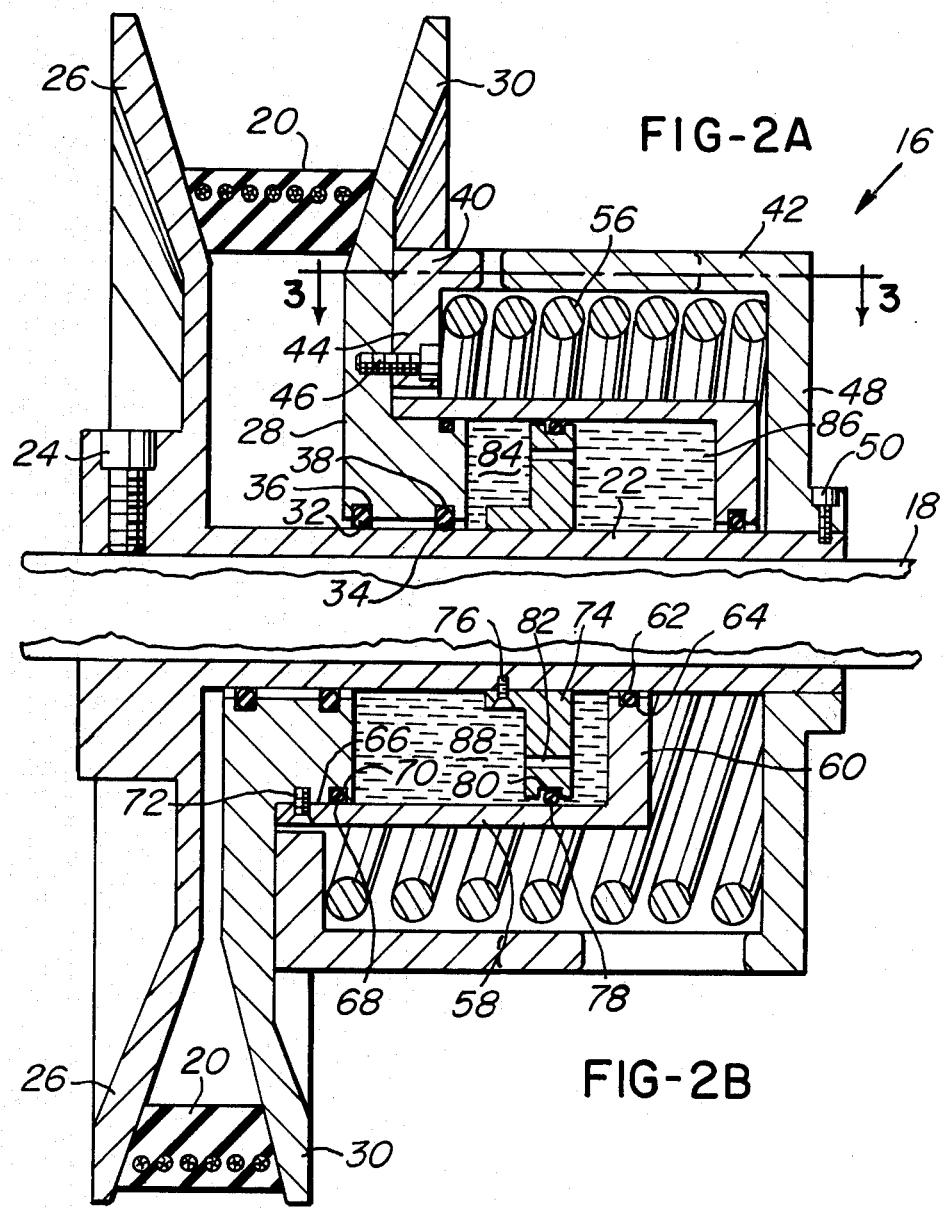
FIG-2A
FIG-2B

TORQUE-SENSING PULLEY AND DRIVE SYSTEM

BACKGROUND OF THE INVENTION

This invention relates to improvements in variable pitch diameter pulleys, and more particularly, to torque-responsive pulleys.

The general system of a speed- and torque-responsive variable ratio belt drive is well known in the art, as shown, for example, in the following U.S. Pat. Nos. 2,678,566, 2,711,103, 3,616,706, 3,625,079, 3,699,827, 3,800,608, 3,842,637 and 4,102,214. In such drive systems, primary control of the drive ratio is generally provided by a speed-responsive pulley driven by the engine, or other rotary power source, and secondary control is provided by a torque-responsive driven pulley which, in response to increased torque in the drive train, applies feed-back belt tension to counteract the speed response and increase the drive ratio over that which the speed-responsive mechanism tends to provide.

Under certain conditions, as where the driven member suddenly encounters an obstacle, commonly referred to as shock loading, the torque-responsive pulley may open too far resulting in the drive belt becoming lodged too deep in the pulley, or bringing about damaging levels of belt slippage. In either event, belt failure may be immediate, or at the very least, premature.

Accordingly, it is an object of the present invention to provide a torque-responsive pulley which overcomes impulsive responses to shock loading.

Other objects of this invention will become apparent as the description progresses.

SUMMARY OF THE INVENTION

In accordance with the present invention, there is provided a torque-responsive pulley comprising a pair of V-belt engaging pulley sections, torque-responsive contact pressure means for controlling the axial spacing of the pulley sections, means for urging the torque-responsive means one to the other, and damping means for preventing sudden change in the axial spacing of the pulley sections. The damping means may be a hydraulic shock absorbing means. As used herein, the term hydraulic is intended to include pneumatic means.

Also provided in accordance with the invention is a drive system embodying the above torque-responsive pulley.

BRIEF DESCRIPTION OF THE DRAWINGS

In the drawings:

FIG. 1 represents a simple variable ratio belt drive system;

FIG. 2A is a section taken essentially on the line 2A—2A of FIG. 1 and showing an upper half portion of the driven pulley of the belt drive system in an open position thereof; FIG. 2B is a section similar to FIG. 2A showing a lower half portion of such pulley;

DETAILED DESCRIPTION OF THE DRAWINGS

Figure 3:
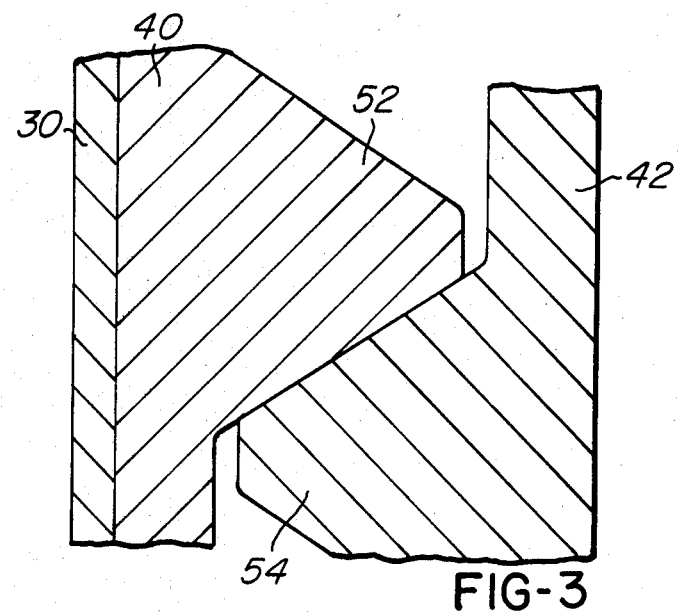
FIG. 3 is a section taken on line 3—3 of FIG. 2.

Referring now to the drawings, and in particular to FIG. 1, the numeral 10 indicates a simple variable ratio drive system comprising an engine, or other power source, a driving shaft 12, a variable diameter driving pulley 14 connected to the shaft 12, a driven torque sensing pulley 16 connected to a driven shaft 18, and a V-belt 20 entrained around and transmitting power from the driving pulley 14 to the driven pulley 16.

Referring now to FIGS. 2A and 2B, the pulley 16 is shown in section with the upper half of the figure showing the pulley 16 in the open position and the lower half showing pulley 16 in the closed position, as is conventionally done in the art. The pulley 16 has a central cylindrical sleeve 22 which surrounds the shaft 18 and is connected thereto by set screw means 24, or other suitable means. The sleeve 22 has a radial V-belt engaging flange 26 at one end thereof. The flange 26 is illustrated as being integral with the sleeve 22, although it may be a separate member. A second cylindrical sleeve 28 having a radial V-belt engaging flange 30 is journaled on the periphery of the sleeve 22. The flange 30 is illustrated as being integral with the sleeve 28, but may also be a separate member. Sleeve 28 is provided with seals 32 and 34 seated in cylindrical grooves 36 and 38, formed in the inner periphery of sleeve 28.

Figure 4:
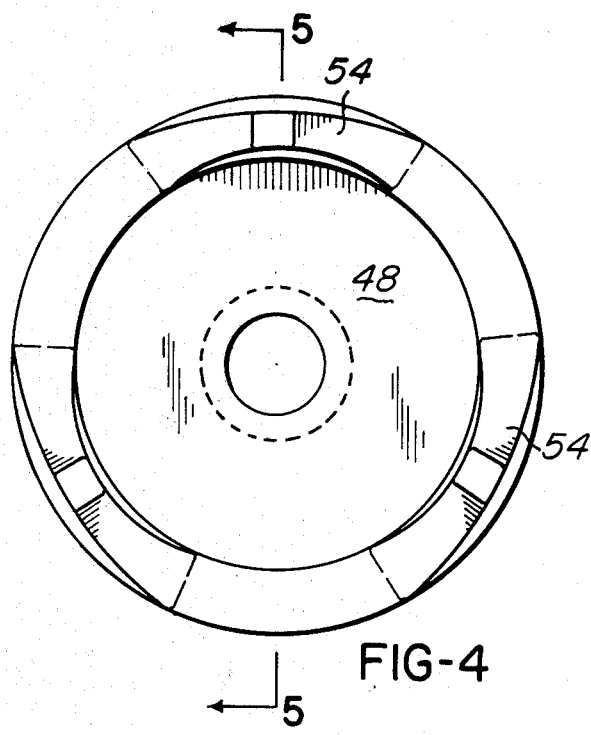
FIG. 4 is a view of a cam member comprising the driven pulley, and shown removed from such pulley, while being viewed parallel to the central longitudinal axis thereof and toward the driving surfaces of three integral cams of such cam member.
Figure 5:
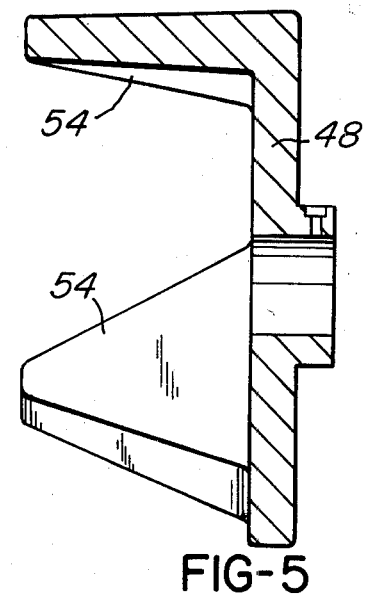
FIG. 5 is a section taken on line 5—5 of FIG. 4.

A pair of cam members 40 and 42 are mounted about the shaft 18. Cam member 40 has an inwardly directed radial flange 44 through which the cam member 40 is drivingly connected to the flange 30 by bolt 46. Cam member 42 has an inwardly directed radial flange 48 which is drivingly connected to the central sleeve 22 by the bolt 50. The cam members 40 and 42 are provided with at least one cam or cam part 52 and 54, respectively, which face each other as shown in FIG. 3 and provide a driving connection therebetween. There are three such cams 52 on the cam member 40, and three such cams 54 on the cam member 42, as shown in the embodiment illustrated in FIG. 4. A coil spring 56 is positioned about the sleeve 22 between the flange 44 of cam member 40 and flange 48 of cam member 42. Spring 56 tends to move the cam members 40 and 42 axially apart.

The pulley 16 has an integral shock absorber comprising a cylindrical housing 58 having an inwardly directed radial end closure 60 which is journaled on the outer periphery of sleeve 22. The end closure 60 is provided with a seal 62 seated in cylindrical groove 64. The opposite end of the housing 58 is open and fits over the shoulder 66 on the second sleeve 28. A seal 68 seated in cylindrical groove 70 is provided between the shoulder 66 and housing 58. The housing 58 is attached to sleeve 28 by screw 72. The shock absorber also comprises a piston 74 which is journaled on the sleeve 22 and attached thereto by a screw 76. A seal 78 seated in cylindrical groove 80 is provided between the piston 74 and the inner periphery of the housing 58. The piston 74 has at least one bore 82 therethrough, connecting the two chambers 84 and 86 of the shock absorber. The chambers 84 and 86 are filled with a suitable liquid 88.

In normal operation, the belt 20 may move between the peripheral position, shown in the lower half of FIG. 2, for low speed and maximum load transmission, and the lower position, shown in the upper half of FIG. 2, for high speed and minimum load transmission. Let us assume that the drive system 10, which comprises the shaft 18, the pulley 16 and the belt 20, is embodied on a motor vehicle and that the vehicle is running on a flat surface, but coming to a steep upward incline. As the vehicle moves onto the incline, the rotary speed of the shaft 18, and consequently of the flange 26 decreases, while that of the belt 20, and consequently, of the flange 30, remains momentarily constant. Because of the upward incline, the load on the power source is increased and an additional torque must be transmitted to the shaft 18. In that moment the belt 20 tends to pull down into the groove between the flange 26 and 30, but is prevented from doing so because at the same moment the cam member 40, which is attached to the faster rotating flange 30, climbs against the cam member 42, which is attached to the slower rotating flange 26, thereby reducing the distance between the flanges 26 and 30. The belt 20 then moves toward the periphery of the pulley for lower speed and greater torque.

Should the vehicle move down a steep incline, the shaft 18 and the flange 26 will rotate faster causing the flange 30 to retard and, consequently, the cam member 40 to move down against the cam member 42. The belt 20 will then move downwardly into the groove for greater speed and lower torque transmission.

In normal operation, the shock absorbing means described previously has little effect on the axial movement of the sleeve 28 and flange 30. The number and size of the bore 82, and the viscosity of the liquid 88 are selected so that such normal operation is not hindered.

Let us assume, however, that an unexpected obstacle is suddenly encountered. The rotary speed of the shaft 18 and, consequently, of the flange 26 is suddenly decreased while that of the belt 20 and, consequently, of the flange 30, remain momentarily constant. In that moment, the belt 20 tends to pull down into the groove between the flanges 26 and 30. Because the cam member 40 is pushing against the cam member 42, the rotary speed of the flange 30 is retarded due to the slower speed of the flange 26. The axial force of the spring 56 is insufficient, together with the axial force contribution of the cam members 40 and 42, to hold the flanges 26 and 30 together. The belt 20 forces the flanges 26 and 30 apart and pulls down into the pulley groove, either lodging in the groove or precipitating damaging levels of slippage between the belt 20 and the pulley flanges 26 and 30. Either event leads to premature, if not immediate, failure of the belt.

Figure 6:
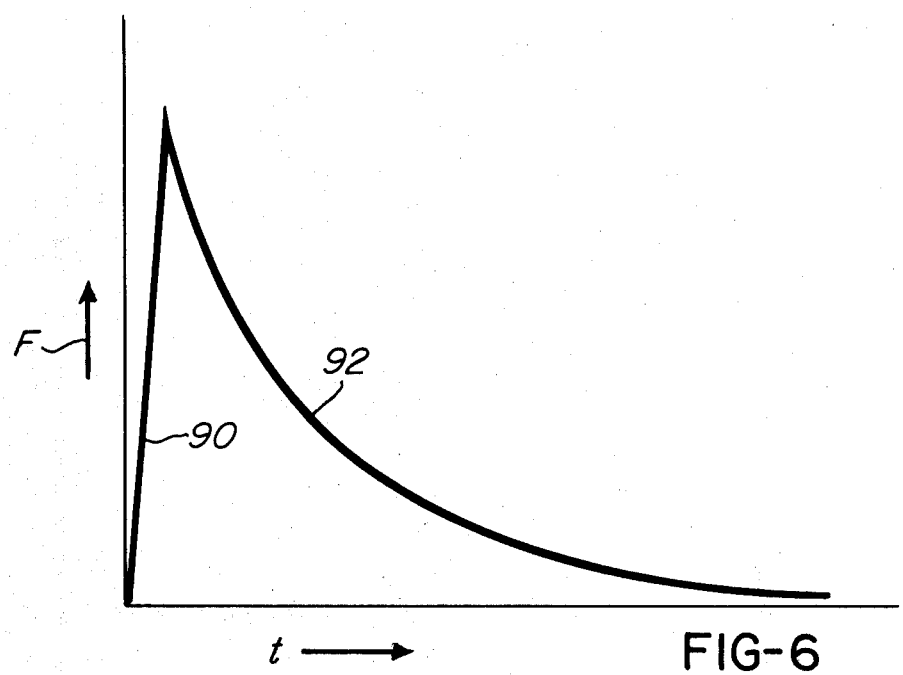
FIG. 6 is a plotted curve illustrating a feature of the invention.

The shock absorbing means described previously prevents sudden pulldown of the belt 20 into the pulley groove between the flanges 26 and 30 by providing a velocity dependent axial force for resisting axial movement of the flange 30 with respect to the flange 26. Through proper selection of the size and/or number of the bore 82, and/or the viscosity of the liquid 88, the resulting effect is to provide a large temporary resistance to the sudden opening or closing of the torque-sensing pulley 16, without providing resistance after a desired time associated with a normal shift in belt pitch diameter. The resisting axial force provided by the shock absorbing means temporarily supplements the axial forces provided by the spring 56 and the cam members 40 and 42. The supplemental axial force is illustrated in FIG. 6, wherein the supplemental force F is plotted against time t. The segment 90 of the Force-time curve illustrates that the resisting axial force provided by the shock absorbing means is almost instantaneously impressed and the segment 92 illustrates the time dependent decay of the force F.

Suitable fluids 88 for use in the pulley of this invention include natural and synthetic liquids, such as petroleum oil, silicone fluids and the like, and gases such as air, nitrogen and the like.

While a preferred embodiment of this invention has been illustrated and described herein, the invention is not to be limited to the form shown and described.

I claim:

1. In a torque-responsive variable diameter V-belt pulley comprising, a first central cylindrical sleeve having a first V-belt engaging pulley section extending from one end thereof, means for fixedly mounting said first sleeve and first pulley section on a rotary shaft, a second cylindrical sleeve having a second V-belt engaging pulley section extending therefrom and having a cylindrical shoulder, said second cylindrical sleeve and second pulley section being mounted over said first sleeve for free rotation relative thereto and axial translational movement thereon so that said second section is movable relative to said first section, said sections defining a V-belt groove therebetween, means for urging said second section toward said first section, torque-responsive contact pressure means for controlling the axial spacing between said pulley sections in response to a change in the load being transmitted by a V-belt in said groove which results in relative rotation of said sections, said torque-responsive means operating to adjust the distance between said sections and allow the belt in said groove to reach a new position therein corresponding to the new load, and damping means for preventing sudden change in said axial spacing of said pulley sections, the improvement wherein said damping means comprises an integral fluid-operated shock absorber which has an integral fluid chamber comprised of portions of both of said sleeves.

2. A pulley as set forth in claim 1 in which said shock absorber further comprises a cylindrical housing having an inner periphery terminating in an open end and a radially inwardly directed end closure at its opposite ends, means attaching said cylindrical housing to said cylindrical shoulder with said open end in sealed relation, fluid seal means between said end closure and said first cylindrical sleeve, said cylindrical housing being free for rotation and axial translation relative to said first sleeve and first section together with said second sleeve and second section, said inner periphery and end closure of said cylindrical housing cooperating with a portion of the outside surface of said first sleeve and a portion of said second sleeve to define said fluid chamber, a piston disposed within said chamber and attached concentrically around said first sleeve in sealed relation, said piston having seal means between its outer periphery and said inner periphery of said housing, said piston dividing said chamber into a first chamber portion and a second chamber portion, at least one bore in said piston connecting said first and second chamber portions, a fluid disposed within said chamber portions, said bore serving to control fluid flow therethrough between said chamber portions and thereby provide means for controlling axial movement of said second section relative to said first section whereby fluid flow through said bore provides a comparatively large temporary resistance to a sudden opening or closing of said axial spacing between said sections yet provides no resistance and allows normal opening and closing of said axial spacing.

3. A pulley as set forth in claim 2 in which said fluid is a liquid.

4. A pulley as set forth in claim 2 in which said fluid is a gas.

5. A pulley as set forth in claim 2 in which said shock absorber temporarily supplements the axial forces provided by said torque-responsive contact pressure means.

6. A pulley as set forth in claim 5 in which said shock absorber through the action of fluid flow through said orifice provides a motion resisting axial force between said pulley sections which is substantially instantaneously impressed and has a gradual time-dependent delay.

7. A pulley as set forth in claim 6 in which said torque-responsive means comprises an oppositely facing pair of cam members in driving relation therebetween, a first one of said cam members being operatively connected to said first pulley section and a second one of said cam members being operatively connected to said second pulley section.

8. In a variable ratio belt drive system comprising a variable diameter driving pulley; a driven torque-sensing pulley; and a V-belt operatively connected between said pulleys; said driven pulley comprising, a first central cylindrical sleeve having a first V-belt engaging pulley section extending from one end thereof, means for fixedly mounting said first sleeve and first pulley section on a rotary shaft, a second cylindrical sleeve having a second V-belt engaging pulley section extending therefrom and having a cylindrical shoulder, said second cylindrical sleeve and second pulley section being mounted over said first sleeve for free rotation relative thereto and axial translational movement thereon so that said second section is movable relative to said first section, said sections defining a V-belt groove therebetween which receives said V-belt, means for urging said second section toward said first section, torque-responsive contact pressure means for controlling the axial spacing between said pulley sections in response to a change in the load being transmitted by said belt which results in relative rotation of said sections, said torque-responsive means operating to adjust the distance between said sections and allow said V-belt to reach a new position in said groove corresponding to the new load, and damping means for preventing sudden change in said axial spacing of said pulley sections, the improvement wherein said damping means comprises an integral fluid-oprated shock absorber which has an integral fluid chamber comprised of portions of both of said sleeves.

9. A drive system as set forth in claim 8 in which said torque-responsive means comprises an oppositely facing pair of cam members in driving relation therebetween, a first one of said cam members being operatively connected to said first pulley section and a second one of said cam members being operatively connected to said second pulley section.

10. A drive system as set forth in claim 8 in which each of said cam members has a plurality of cams thereon, said means for urging said second section toward said first section is a coil spring, and said fluid chamber is disposed within the confines of said coil spring.

* * * * *